United States Patent

[11] 3,568,936

| [72] | Inventor | Darrel Lee Honnold<br>Winterset, Iowa |
|---|---|---|
| [21] | Appl. No. | 801,541 |
| [22] | Filed | Feb. 24, 1969 |
| [45] | Patented | Mar. 9, 1971 |
| [73] | Assignee | Deere & Company<br>Moline, Ill. |

[54] DIFFUSER FOR GRANULAR MATERIAL
5 Claims, 5 Drawing Figs.

[52] U.S. Cl............................................... 239/590.5,
239/600
[51] Int. Cl.............................................. B05b 1/14
[50] Field of Search........................................... 239/689,
590.5, 600

[56] References Cited
UNITED STATES PATENTS

| 2,609,240 | 9/1952 | Faulkner et al. | 239/590.5 |
| 2,684,690 | 7/1954 | Lee | 239/590.5 |
| 3,074,727 | 1/1963 | Sosalla et al. | 239/590.5 |

*Primary Examiner*—Lloyd L. King
*Attorneys*—H. Vincent Harsha, Harold M. Knoth, William A. Murray and John M. Nolan

ABSTRACT: A diffuser for granular herbicide dispensers which is formed of two sections constructed from plastic. Each section consists of a generally vertical wall having flanges along its side edges and a plurality of integrally formed protrusions. When the two sections are placed together the flanges overlap and the protrusions abut. The flanges which form sidewalls are generally downwardly divergent so that, as material is dispensed through the diffuser it strikes the protrusions and is spread laterally over a relatively wide area.

PATENTED MAR 9 1971　　　　　　　　　　　　　　3,568,936

INVENTOR.
D. L. HONNOLD

DIFFUSER FOR GRANULAR MATERIAL

BACKGROUND OF THE INVENTION

The present invention relates generally to distributors of granular herbicides, insecticides and the like, and more particularly relates to diffusers for dispensers for granular herbicides which will dispense material over a relatively wide area.

The typical granular herbicide dispenser discharges material through a confined opening in the bottom of a hopper so that the material falls downwardly onto the area being treated. However, if the material falls directly from the hopper onto the area being treated, it does not get distributed evenly over the entire area. Therefore, it has become the practice to associate a diffuser with the dispenser so material is discharged from the dispenser through the diffuser and then onto the area being treated. As the material passes through the diffuser it is spread laterally and distributed uniformly over a relatively wide strip of the area being treated. A typical dispenser and diffuser as described above are illustrated in U.S. Pat. No. 3,204,588 which issued on Sept. 7, 1965, to L. W. Johnson. While the diffusers heretofore known and used have performed efficiently, they have been extremely complicated, have been constructed of numerous parts, and have been expensive to manufacture and assemble.

SUMMARY OF THE INVENTION

The principle object of the present invention is to provide a diffuser for granular material which is of simplified construction as compared to previous diffusers.

Another object of the present invention is to provide a novel diffuser apparatus which uniformly distributes granular herbicide or insecticide over a relatively wide path, is constructed of few parts, is easily assembled, and is susceptible to economical manufacture.

According to the present invention, the diffuser is formed of two parts which are constructed from a plastic material so as to be able to absorb impacts without being permanently deformed, so as to possess an inherent resistence to corrosion, and so as to be susceptible to simple and economical manufacture. Each of the parts includes a generally vertical wall having downwardly divergent flanges projecting from its side edges toward the other part and overlapping the flanges on the other part to form sidewalls. Each part also includes a plurality of protrusions which are formed integrally with the vertical wall and which abut corresponding protrusions on the other part. As the granular herbicide or pesticide passes through the diffuser, it strikes the protrusions and is spread over the entire area within the confines of the sidewalls.

The above objects and additional objects and advantages will become apparent along with the details of construction of a preferred embodiment of the invention to those skilled in the art from a reading of the following detailed description when taken into consideration with the accompanying drawing.

DESCRIPTION OF THE PREFERRED EMBODIMENT

Figure 1:
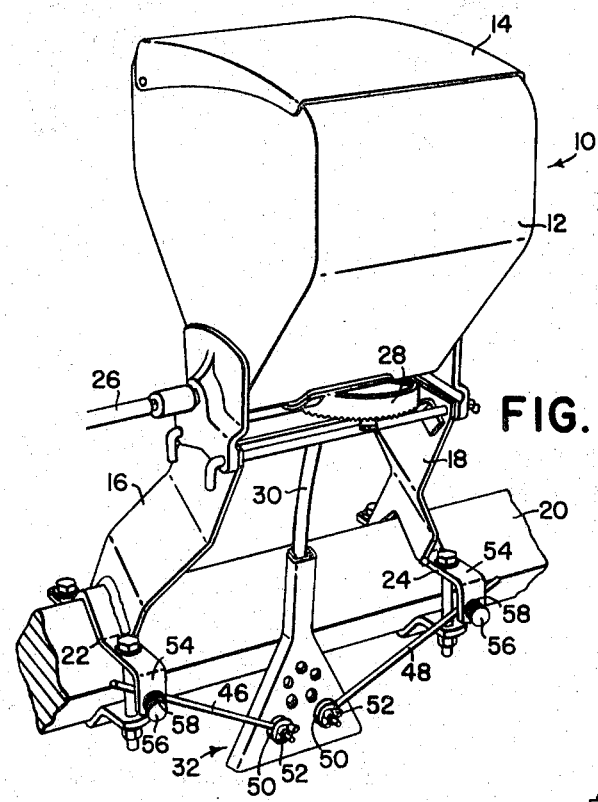
FIG. 1 is a perspective view of a granular herbicide dispenser and a diffuser according to the invention, illustrating the use of the diffuser.
Figure 5:
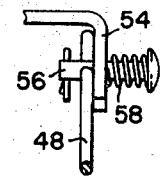
FIG. 5 is a fragmentary side elevation view of a portion of the mounting structure for the diffuser.

With reference to the drawing, a granular material dispenser is indicated in its entirety by the numeral 10 and includes a hopper 12 having a pivotally mounted cover 14. The hopper 12 is carried by a pair of brackets 16 and 18 which are secured to a tool bar 20 by clamps 22 and 24. The tool bar 20 can be integrally mounted to a tractor three-point hitch or it can form part of a drawn implement.

The material dispenser 10 is generally of the type illustrated in the aforementioned U.S. Pat. No. 3,045,588 and includes a feed rotor within the bottom of the hopper 12 which is driven through the shaft 26. The feed rotor positively discharges material through an opening provided in the bottom of the hopper 12 to an adjustable metering gate 28. Material that passes through the gate 28 drops through a delivery tube 30 to a diffuser apparatus indicated generally at 32.

The diffuser 32 includes a front wall 34 having flanges 36 along its side edges and a rear wall 38 having flanges 40 along its side edges. The rear wall 38 has a width slightly greater than the front wall 34 so that when the front and rear walls are positioned adjacent and parallel to each other, the flanges 36 and 40 overlap to form sidewalls. The diffuser is generally vertically disposed as best illustrated in FIG. 1, and has upper and lower portions. The sidewalls on the upper portion of the diffuser extend generally parallel to each other and are spaced apart a distance substantially equal to the distance between the front and rear walls so that the upper portion of the diffuser provides a passageway of a size just sufficient to receive the lower end of the delivery tube 30. The sidewalls on the bottom portion of the diffuser are downwardly divergent so as to provide a relatively wide bottom opening in the diffuser as compared to the upper opening.

Figure 4:
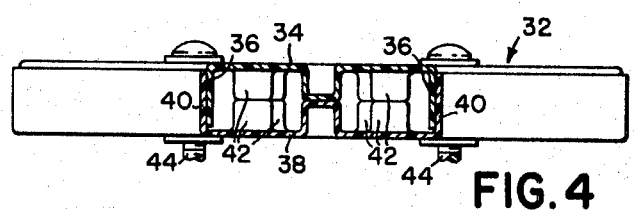
FIG. 4 is a sectional view taken substantially along a line 4—4 of FIG. 2.
Figure 2:
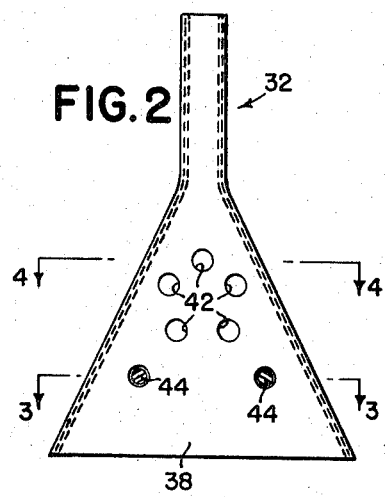
FIG. 2 is a rear elevation view of the diffuser illustrated in FIG. 1.
Figure 3:
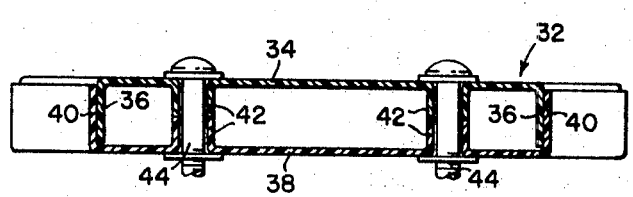
FIG. 3 is a sectional view taken substantially along a line 3—3 of FIG. 2.

A plurality of protrusions 42 are provided on the front and rear walls 34 and 38 on the lower portions thereof between the divergent sidewalls. The protrusions 42 on each of the front and rear walls extend in the same direction and substantially half as far as the flanges on the corresponding wall and are positioned to abut the corresponding protrusions on the opposite wall as illustrated in FIGS. 3 and 4. Each of the protrusions 42 is hollow and, with exception of the lowermost pair of protrusions on each of the front and rear walls, each is closed at its inner end. The protrusions 42 are so positioned that as material drops from the delivery tube through the diffuser apparatus, it impinges upon the protrusions and is diffused laterally and distributed uniformly over a relatively wide strip of ground.

The inner ends of the two lowermost protrusions 42 on each of the front and rear walls is open so that the abutting protrusions form channels extending through the diffuser. A pair of bolts 44 extend through the channels formed by the open-ended protrusions and serve to maintain the two sections of the diffuser in a proper position with respect to one another and also serve to mount the diffuser on the tool bar 20. The diffuser 32 is suspended from the tool bar 20 by a pair of rods 46 and 48. One end of each of the rods 46 and 48 is provided with an eye 50 which is placed over one of the bolts 44 and retained thereon by a butterfly nut 52. The opposite ends of the rods 46 and 48 are secured to the clamps 22 and 24 respectively. For the purpose of securing the diffuser mounting rods 46 and 48 to the clamps 22 and 24, each of the clamps is provided with an apertured ear 54 which carries a pin 56. The pins 56 are apertured to receive the rods 46 and 48, and each is biased outwardly by a spring 58 so that the rods 46 and 48 are frictionally held between the ears 54 and a wall of the apertures provided in the pins 56.

The diffuser is constructed of a relatively firm, but yieldable, plastic material so as to possess an inherent resistence to corrosion, and also so that it can absorb impacts without being permanently deformed. Also, by constructing the diffuser from a plastic, the two sections can be simply and economically manufactured with the integral protrusions.

From the foregoing it can be seen that the present invention provides a diffuser which is of extremely simple construction and is easily mounted to dispensers for granular material.

While the preferred embodiment of the invention has been illustrated and described, variations and modifications thereof will become apparent to those skilled in the art without departing from the underlying principles of the invention.

I claim:

1. A diffuser for granular materials comprising: a generally vertically disposed structure having front and rear walls; there being flanges along the side edges of each wall projecting toward the other wall and overlapping the flanges on the other wall; the flanges forming sidewalls; a plurality of protrusions integrally formed on each of the front and rear walls with each protrusion on each wall being spaced from at least one other protrusion on the same wall in both the horizontal and vertical directions; and each protrusion projecting toward the opposite wall approximately one-half the distance which the flanges project; the protrusions on each wall being positioned to have their inner ends abut the inner ends of corresponding protrusions on the opposite wall; and means maintaining the front and rear walls in a position with their flanges overlapping and their protrusions abutting; whereby material dispensed between the walls will strike the protrusions and be diffused over a relatively wide area.

2. The diffuser set forth in claim 1 wherein the front and rear walls are positioned generally parallel to each other, the upper portion of the sidewalls extend generally parallel to each other and are spaced a distance substantially equal to the spacing between the front and rear walls to form a generally rectangular upper throat portion, the lower portion of the sidewalls are downwardly divergent to form a generally triangular lower portion, and the protrusions on the front and rear walls are spaced between the divergent portions of the sidewalls.

3. The diffuser set forth in claim 2 wherein the distance between the flanges on one of the front and rear walls is slightly less than the distance between the flanges on the other of the front and rear walls whereby the flanges on the one of the front and rear walls will be positioned within the confines of the flanges on the other of the front and rear walls.

4. The diffuser set forth in claim 2 wherein at least one corresponding pair of protrusions on the front and rear walls are hollow and open at their abutting ends, and wherein the means maintaining the front and rear walls in a position with their flanges overlapping includes bolt means extending through the open-ended protrusions.

5. The diffuser set forth in claim 2 wherein each of the protrusions is hollow.